(No Model.) 2 Sheets—Sheet 1.
C. TEPEL.
CALIPERS FOR INSIDE AND OUTSIDE MEASUREMENT.
No. 347,016. Patented Aug. 10, 1886.
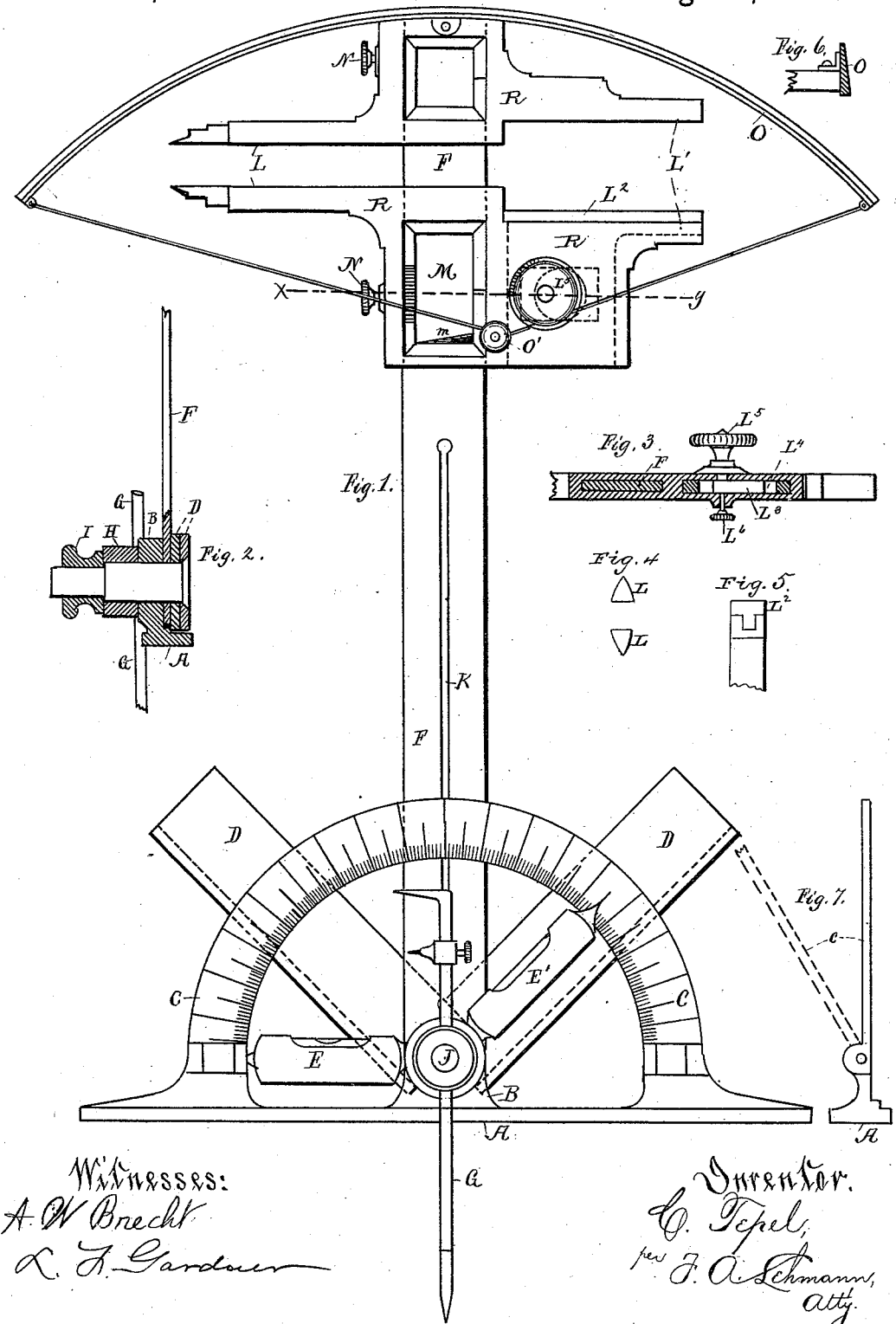

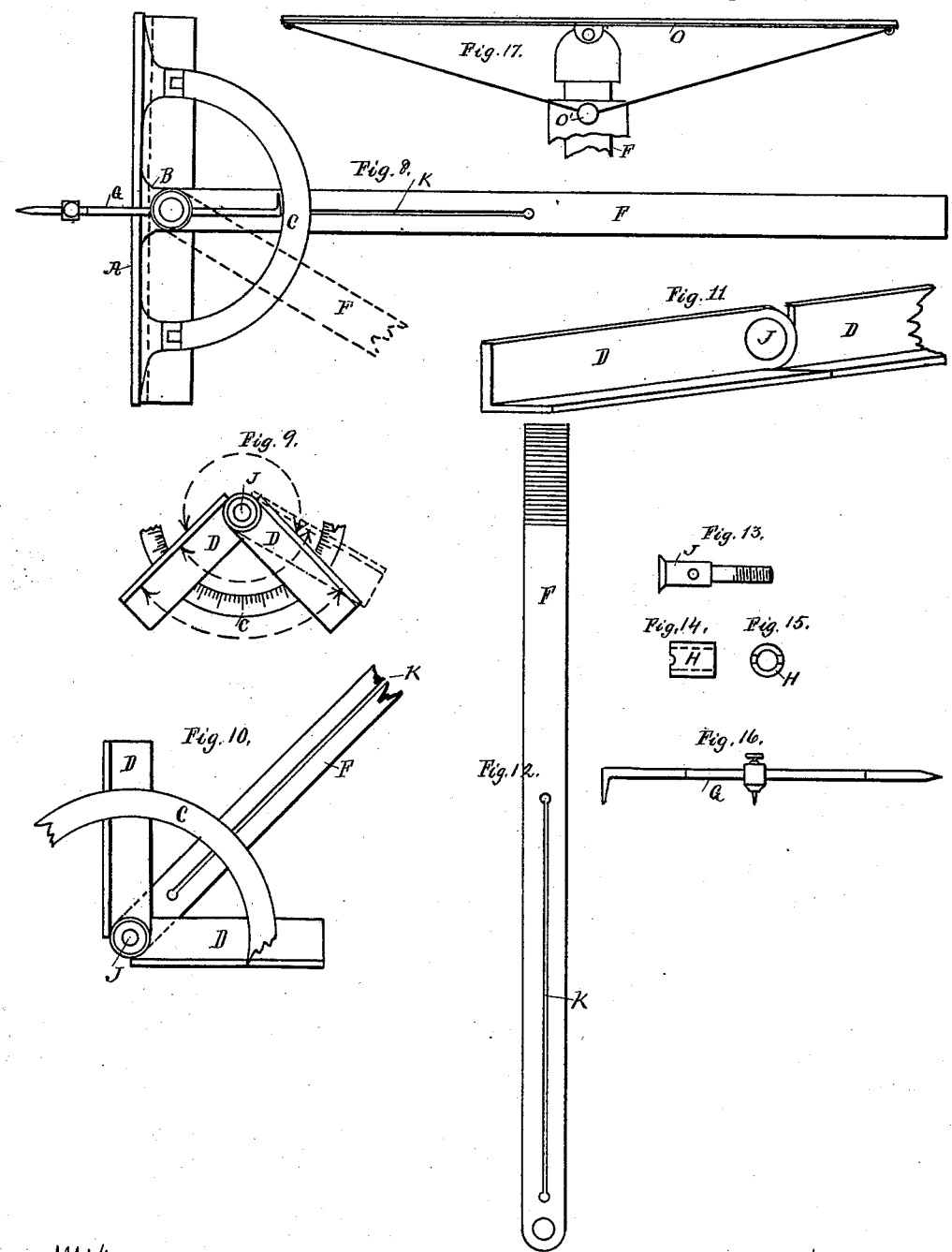

UNITED STATES PATENT OFFICE.

CHRISTIAN TEPEL, OF PITTSBURG, PENNSYLVANIA.

CALIPERS FOR INSIDE AND OUTSIDE MEASUREMENT.

SPECIFICATION forming part of Letters Patent No. 347,016, dated August 10, 1886.

Application filed November 6, 1885. Serial No. 182,038. (No model.)

*To all whom it may concern:*

Be it known that I, CHRISTIAN TEPEL, a citizen of the United States, residing at Pittsburg, in the county of Allegheny and State of Pennsylvania, have invented certain new and useful Improvements in Gages; and I do hereby declare the following to be a full, clear, and exact description of the invention, such as will enable others skilled in the art to which it appertains to make and use the same.

My invention relates to improvements in gages to accurately measure the volume and relative position of parts of a machine; to ascertain to a minute degree any deviation of lines; to discover errors or faults in the construction of parts entering into a combination; to ascertain the exact dimensions of parts for the perfection of a machine, and for other purposes.

The accompanying drawings represent my invention, showing the combined instrument and detached portions of the same.

Figure 1 represents a plan view of the instrument; Fig. 2, a sectional elevation of the center pin; Fig. 3, a sectional elevation on the line $x\ y$; Fig. 4, an end view of the inside calipers; Fig. 5, an end view of the outside calipers; Fig. 6, a section of the rod for making regular curves; Fig. 7, a side elevation of the hinged protractor; Fig. 8, a plan view of the fixed and the adjustable T-square, deep-scale, and scriber; Fig. 9, a plan view of the double-angle measurer; Fig. 10, a plan view of the center-square; Fig. 11, a plan view of the box-square. Fig. 12 shows the graded ruler or straight-edge; Fig. 13, a detailed view of the center pin; Figs. 14 and 15, detailed views of the bushing; Fig. 16, the scriber and surface-gage. Fig. 17 is a plan view of the attachment used when curves of long radius are to be obtained.

A represents a straight base, in the middle of which is fastened a block, B, through which passes the center pin, J, that holds various parts of the instrument together, among which are the two arms D of a box-square and a ruler, F. On the base A is hinged a protractor, C, graded on both sides to indicate the angle at which both or either of the arms D may be raised or held. The protractor, being hinged, can be bent down when not needed.

E is a stationary spirit-level fastened between the block B and the hinge of the protractor C, and E', at the opposite side of the former, is a movable level to indicate on the protractor the degree of deviation of the base from a horizontal line.

F is a graded ruler or straight-edge with a longitudinal slot in its middle, for marking the center when used with the center-square; and when placed at a right angle with the base the ruler may be used as a T-square, and changed to any desired angle to be held in position by the center pin, J.

G is a scriber passing through the center block, B, and may also serve as a deep-scale, its finger indicating on the scale on the ruler F the distance below the base; and when inverted it serves as a surface-gage. Placed upon the end of the ruler F are the two sliding jaws R, each one of which is provided with the points L L', as shown.

L represents inside calipers sliding on the ruler F, used for measuring the width of an opening; and L', calipers for outside measure. $L^2$ is a part of the latter to be raised to indicate more minutely the distance, as shown by the corresponding scale on the ruler, and is acted upon by an eccentric, $L^3$, in box $L^4$, to be operated by $L^5$, and held in place by thumb-screw $L^6$. The ends of the inside caliper, L, are diminished by steps, and terminate in points for greater accuracy in determining the diameter or width of small openings, the pointed ends also serving for compasses. The outside of the calipers L always corresponds to the inside of calipers L'.

M is an oblong opening in the lower half of the calipers, with beveled graded insides to show the position of the calipers on the graded scale on the ruler F, exposed through the opening. On the lower edge of the opening M is inserted an incline, $m$, having its elevated portion at one side and its decline terminating at the opposite corner, which incline, being horizontally minutely graded, shows, when compared with the scales on the ruler and sides of the opening M, small differences that cannot be detected on them.

N N are thumb-screws for holding the upper and lower parts of the calipers in position.

O is a flexible steel strip, attached at its middle to the upper part of the calipers. A wire is fastened to both ends of the strip O, having its middle wound around a thumb-screw, O', so that by turning the screw the tension of the wire is increased at one side and relaxed on the other, whereby the strip assumes more or less the form of an irregular arc, which can be changed at pleasure. To obtain a regular arc of greater or less curvature, the wire is to be adjusted with its middle around the screw, and the lower part of the calipers drawn down the necessary distance and confined by the screw N. For curvatures of a long radius the attachment shown in Fig. 17 is applied, to avoid an interference of the calipers.

By changing the position of the ruler F the arc may be inclined to either side, to be scribed where it is wanted.

Aside from the appliances hereinbefore mentioned, there are many occasions when parts of the instrument, detached or combined, will be found of great use to the mechanic employed at the construction of machinery where great accuracy is required.

Having thus described my invention, I claim—

1. The combination of the ruler F, the two jaws R, provided with the points L L', the strip $L^2$, placed upon the inner side of one of the points, L', and the cam $L^3$, placed in the jaw for moving the strip $L^2$, substantially as described.

2. The combination of the ruler F, the two jaws R, placed thereon, the steel strip secured to one of the jaws, the wire which connects the ends of the strip, and the thumb-screw placed on the other of the jaws for the wire to wrap around, substantially as set forth.

In testimony whereof I affix my signature in presence of two witnesses.

CHRISTIAN TEPEL.

Witnesses:
 LOUIS MOESER,
 IG. STAUFFER.